(12) United States Patent
Takeda et al.

(10) Patent No.: US 7,289,313 B2
(45) Date of Patent: Oct. 30, 2007

(54) SOLID ELECTROLYTIC CAPACITOR AND METHOD FOR MANUFACTURING SAME

(75) Inventors: Yukifumi Takeda, Takarazuka (JP); Tomoko Hosokawa, Neyagawa (JP); Masato Ozawa, Kyoto (JP); Shin Yakushiji, Yamaguchi (JP); Yukihiro Nitta, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 451 days.

(21) Appl. No.: 10/512,568

(22) PCT Filed: Feb. 19, 2004

(86) PCT No.: PCT/JP2004/001905

§ 371 (c)(1),
(2), (4) Date: Oct. 26, 2004

(87) PCT Pub. No.: WO2004/075220

PCT Pub. Date: Sep. 2, 2004

(65) Prior Publication Data

US 2005/0237696 A1    Oct. 27, 2005

(30) Foreign Application Priority Data

Feb. 19, 2003  (JP)  ............... 2003-041109
Mar. 24, 2003  (JP)  ............... 2003-080280

(51) Int. Cl.
*H01G 9/00*    (2006.01)

(52) U.S. Cl. .......... 361/523; 361/525; 361/528; 361/529; 361/516; 361/519; 29/25.01; 29/25.03

(58) Field of Classification Search ........ 361/523–525, 361/528–534, 516–519, 508–509; 29/25.01, 29/25.03
See application file for complete search history.

(56) References Cited

U.S. PATENT DOCUMENTS

| | | | |
|---|---|---|---|
| 6,430,033 B1 * | 8/2002 | Mitsui et al. | 361/525 |
| 6,663,796 B1 * | 12/2003 | Ohata et al. | 361/525 |
| 6,890,363 B1 * | 5/2005 | Sakai et al. | 29/25.03 |
| 6,906,913 B2 * | 6/2005 | Kochi et al. | 361/529 |

FOREIGN PATENT DOCUMENTS

| | | |
|---|---|---|
| JP | 2-130906 | 5/1990 |
| JP | 9-025417 | 1/1997 |
| JP | 2000-150311 | 5/2000 |
| JP | 2002-128877 | 5/2002 |

* cited by examiner

*Primary Examiner*—Nguyen T. Ha
(74) *Attorney, Agent, or Firm*—Wenderoth, Lind & Ponack, L.L.P.

(57) ABSTRACT

A solid electrolytic capacitor includes: a dielectric oxide film 2; a solid electrolyte 3 composed of a conductive polymer; a carbon layer 4; and a silver layer 5; formed sequentially on a surface of an anode 1 composed of a valve metal. The capacitor has excellent leakage current characteristics and electrical characteristics under hot and humid conditions due to doped naphthalenesulfonic acid compounds in the conductive polymer.

20 Claims, 5 Drawing Sheets

SOLID ELECTROLYTIC CAPACITOR AND METHOD FOR MANUFACTURING SAME

BACKGROUND OF THE INVENTION

The present invention relates to a solid electrolytic capacitor for a variety of electronic equipment and manufacturing methods thereof.

A recent trend of digitalization in electronic equipment has caused increasing demand for downsized capacitors with large capacitances and low impedances at high frequency. In conventional art, the following capacitors are used for high frequency applications: plastic film capacitors; mica capacitors; and multi-layered ceramic capacitors. Also, there are aluminum dry electrolytic capacitors, aluminum solid electrolytic capacitors, tantalum solid electrolytic capacitors and the like. An aluminum dry electrolytic capacitor consists essentially of an etched aluminum anode and a cathode rolled up into a cylinder with a separator in between to form a device, impregnating the separator with a liquid electrolyte.

An aluminum solid electrolytic capacitor or a tantalum solid electrolytic capacitor employs a solid electrolyte to improve performance of the aluminum dry electrolytic capacitor.

A method of manufacturing the solid electrolyte is described: an anode is dipped in manganese nitrate solution; the anode is pyrolytically decomposed in a furnace at approximately 250° C. to 350° C.; a manganese oxide layer as the solid electrolyte is formed on the anode. Capacitors having the solid electrolyte show better frequency characteristics and temperature characteristics compared with capacitors with the liquid electrolyte, as the solid electrolyte is free from problems inherent in liquid electrolytes such as outflows of electrolytes at a high temperature, decrease in capacitance owing to a dry up or function degradations owing to hardening of electrolytes at low temperatures.

Japanese Patent Laid-Open Application No. H02-130906 discloses a solid electrolytic capacitor having a solid electrolyte composed of conductive polymers polymerized from monomers such as pyrrole and thiophene.

A method of manufacturing a solid electrolyte composed of conductive polymers for use in the solid electrolytic capacitor is described below.

First, a pre coat layer composed of conductive materials such as manganese oxide, conductive polymer or the like is formed on a surface of a dielectric oxide film of a valve metal. Next, the solid electrolyte composed of conductive polymers is formed through: (1) an electrolytic polymerization by supplied electricity to the pre coat layer in electrolytic solution for polymerization containing monomer and a dopant, or (2) a chemical polymerization by dipping the pre coat layer in electrolytic solution for polymerization containing an oxidizing agent. Generally, sulfonic acid compounds or phosphoric acid compounds are used as the dopants to produce the solid electrolytic capacitor by the manufacturing methods. The strongly acidic dopants cited above, however, have a problem that undoping of the dopants, especially in highly humid environments, causes damage on the dielectric oxide film of valve metal, or decreases in product reliability due to poor forming. A measure proposed for the problem is to use alkyl aromatic sulfone compound or the like as a dopant to prevent degradation of equivalent series resistances (ESR) and capacitances caused by undoping. Another problem, however, arises that a usable rate of capacitance decreases in this case.

The decrease in the usable rate of capacitance is supposedly caused by the facts that:

(1) a polymer is apt to be bulky when dopants having a large steric hindrance such as alkyl aromatic sulfone compound or the like are adopted, and (2) a polymer is apt to be formed concentrated on edges of rough surfaces of the dielectric oxide film of valve metal.

On the other hand, although an excellent usable rate of capacitance is obtained when a large quantity of compounds with a small steric hindrance such as sulfuric acid or the like are used as the dopants, a significant degradation will occur in characteristics due to undoping of the sulfuric acid under hot and humid environments.

SUMMARY OF THE INVENTION

To solve the above problems, the present invention can provide a solid electrolytic capacitor with excellent electrical characteristics even under hot and humid environments. The solid electrolytic capacitor comprises: an anode composed of a valve metal whose surface is provided with a dielectric oxide film; a solid electrolyte, composed of conductive polymers, formed on the dielectric oxide film; and a cathode formed on the solid electrolyte, wherein the solid electrolyte contains naphthalenesulfonate compounds.

A method of manufacturing a solid electrolytic capacitor, the solid electrolytic capacitor comprising: an anode composed of a valve metal whose surface is provided with a dielectric oxide film; a solid electrolyte, composed of conductive polymers, formed on the dielectric oxide film; and a cathode formed on the solid electrolyte, and the method comprising: dipping the anode into electrolytic solution for polymerization containing monomer to form the conductive polymers, naphthalenesulfonic acid compounds and water; and forming the solid electrolyte on the dielectric oxide film by chemical polymerization or electrolytic polymerization. The solid electrolytic capacitor is provided with excellent leakage current characteristics, ESR and capacitance characteristics even under hot and humid environments.

DETAILED DESCRIPTION OF THE INVENTION

Figure 1:
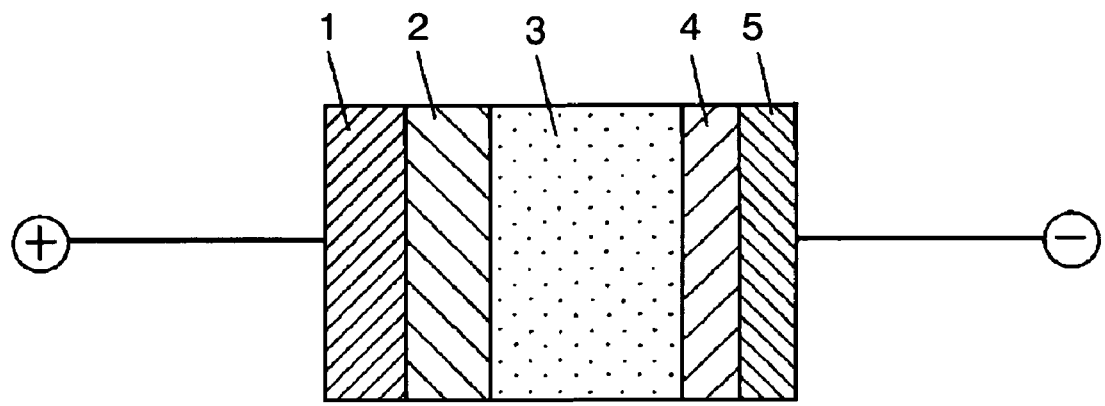
FIG. 1 illustrates a schematic cross-sectional view showing a solid electrolytic capacitor used in an example of the present invention.

The solid electrolytic capacitor disclosed in the present invention comprises a solid electrolyte composed of conductive polymers doped with at least compound (I). The solid electrolytic capacitor of the present invention has excellent characteristics even in hot and humid environments. This is because dopants having carboxyl groups promote forming and provide the solid electrolytic capacitor with excellent characteristics especially in leakage current and ESR even under hot and humid environments. Additionally, dopant with small steric hindrance such as compound (I) is thought to be able to form a solid electrolyte composed of an orderly conductive polymer that would contribute to excellent initial capacitance characteristics of the solid electrolytic capacitor.

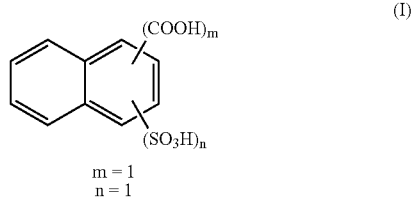

$m = 1$
$n = 1$

The content of compound (I) to 1 mol of a monomer that forms the solid electrolyte composed of conductive polymer should preferably range from 0.05 to 0.5 mol. The configuration can provide the solid electrolytic capacitor with further excellent ESR and impedance characteristics.

Doping less than 0.05 mol of compound (I) to 1 mol of a monomer that forms the solid electrolyte composed of conductive polymer causes poor ESR characteristics due to low electrical conductivity. Contrarily, doping more than 0.5 mol of compound (I) is not preferable, as it will also cause poor ESR characteristics owing to a steric hindrance due to the excess amounts of the dopant, thereby causing regularity of the main chain of conductive polymer to lower.

Monomers should preferably be selected from at least one of pyrrole, thiophene, furan, aniline and their derivatives to form the solid electrolyte composed of conductive polymers. Those monomers can provide the solid electrolytic capacitor with good impedance characteristics at high frequencies due to high electrical conductivity.

Adding phenol derivatives to the solid electrolyte composed of conductive polymers can provide the solid electrolytic capacitor with stable performance even in hot environments as the phenol derivatives can increase the degree of order of polymer skeleton.

Phenol derivatives should preferably be selected from at least one of nitrophenol, cyanophenol, hydroxybenzoic acid, and hydroxyphenol. Those chemicals can further improve the characteristics of the solid electrolytic capacitor under hot and humid conditions.

Phenol derivatives are selected from: o-nitrophenol, m-nitrophenol, p-nitrophenol, o-cyanophenol, m-cyanophenol, p-cyanophenol, o-hydroxybenzoic acid, m-hydroxybenzoic acid, p-hydroxybenzoic acid, o-hydroxyphenol, m-hydroxyphenol and p-hydroxyphenol.

Also, sulfuric acid can be doped into the solid electrolyte composed of conductive polymers. The sulfuric acid is thought taken into the conductive polymers as a dopant. Compounds, such as sulfuric acid, with molecular structure of a small stretic hindrance will alter the filling factor of formed polymers, enabling the provision of a solid electrolytic capacitor with a high usable rate of capacitance.

Next, an example of the manufacturing method of the solid electrolytic capacitor in the present invention is described roughly. That is, the conductive polymer composing the solid electrolyte is formed by polymerization using solution involving water as a solvent containing at least a monomer and compound (I).

Especially, forming (or anodizing) carried out during electrolytic polymerization using water as a base solution can provide the solid electrolytic capacitor with further excellent leakage current characteristics, and ESR and capacitance characteristics under humid environments, as compound (I) performs forming very well.

Monomers should preferably be selected from at least one of pyrrole, thiophene, aniline and their derivatives. Those monomers can provide the solid electrolytic capacitor with excellent impedance characteristics at high frequencies due to a higher electrical conductivity.

At least one of phenol derivatives, sulfuric acid and alcohols can be added to the electrolytic solution for polymerization. Those chemicals can provide an excellent capacitance usable rate and can form a solid electrolyte with a stable film quality.

The phenol derivatives should preferably be selected from at least one of nitrophenol, cyanophenol, hydroxybenzoic acid and hydroxyphenol, and should preferably have the concentration in electrolytic solution for polymerization ranging from 0.01 to 0.1 mol. As the phenol derivatives enhance the degree of order of polymer skeleton, the solid electrolyte with excellent ESR and capacitance characteristics is obtained.

The concentration of phenol derivatives in electrolytic solution for polymerization of less than 0.01 mol will cause decrease in heat resistance due to a lower degree of order of the formed polymer. Contrarily, the concentration of phenol derivatives in electrolytic solution for polymerization of more than 0.1 mol is not preferable because polymerizing current concentrates on edges due to faster polymerization rates, causing an uneven polymer thickness, thereby causing decrease in leakage current characteristics owing to stresses occurring when the capacitor elements are layered.

The concentration of sulfuric acid in electrolytic solution for polymerization should preferably range from 0.01 to 1 wt %. Doping of sulfuric acid can alter the filling factor of formed polymer and can contribute to form a solid electrolyte with a further excellent usable rate of capacitance.

The concentration of sulfuric acid in electrolytic solution for polymerization of less than 0.01 wt % will not provide enough effects on the usable rate of capacitance. Contrarily, the concentration of sulfuric acid in the electrolytic solution for polymerization of more than 1 wt % is not preferable because doped sulfuric acid will cause dissolution in humid conditions, causing a drastic decrease in ESR and capacitance characteristics.

Alcohols having a carbon number ranging from 1 to 4 may be involved in the electrolytic solution for polymerization and the alcohol concentration in electrolytic solution for polymerization should preferably range from 0.5 to 20 in wt %. The addition of organic solvents such as alcohols to the electrolytic solution for polymerization can perform especially to restrain polymerization reactions on edges, resulting in improved surface conditions of conductive polymers produced. Followings are the organic solvents: methyl alcohol, ethyl alcohol, n-propyl alcohol, 2-propyl alcohol, n-butyl alcohol, 2-butyl alcohol, 3-butyl alcohol, tert-butyl alcohol, acetonitrile, acetone, tetrahydrofuran, ethylene glycol, y-butyl lactone, dimethylformamide and dimethylsulfoxide.

The concentration of alcohols in electrolytic solution for polymerization of less than 0.5 wt % is not preferable because polymerizing current concentrates on edges, causing the polymer to have an uneven thickness, thereby causing poor leakage current characteristics owing to stresses occurring when the capacitor elements are layered. The concentration of alcohols in electrolytic solution for polymerization of more than 20 wt % is also not preferable because of a longer polymerization time due to lowered polymerizing rate, causing productivity of the capacitor to decrease drastically.

The solid electrolyte composed of conductive polymer can be produced by electrolytic polymerization. The electrolytic polymerization can form a conductive polymer with a high steric order, resulting in the solid electrolyte having an even polymer film thickness and a high electrical conductivity.

The polymerization voltage should preferably range from 1 to 3 V. The applying voltage can control the polymerization reaction to form a solid electrolyte having a high usable rate of capacitance.

The electrolytic polymerization voltage lower than 1 V is not preferable because of longer polymerization time. The electrolytic polymerization voltage higher than 3 V is also not preferable because side reaction such as electrolysis of water or the like will increase proportionally, causing capacitor characteristics such as initial ESR, capacitance or the like to decrease.

Next, another example of the manufacturing method of the solid electrolytic capacitor in the present invention is described roughly.

That is, the conductive polymer composing the solid electrolyte is formed by electrolytic polymerization using aqueous electrolytic solution for polymerization containing at least a monomer, naphthalenesulfonic acid compound (hereafter referred to as compound (II)) and sulfuric acid, wherein the molar concentration ratio of compound (II) to sulfuric acid ranges from 50:1 to 4:1, and the surface tension is lower than $70 \times 10^{-3}$ N/m. The method can provide a solid electrolytic capacitor with a high usable rate of capacitance and with little decrease in characteristics even in hot and humid conditions.

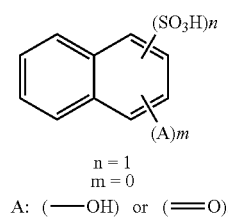

n = 1
m = 0
A: (—OH) or (═O).

The molar concentration ratio of compound (II) to sulfuric acid of larger than 50:1 is not preferable because the smaller content of the sulfuric acid makes little improvement in the usable rate of capacitance. The molar concentration ratio of compound (II) to sulfuric acid of smaller than 4:1 is also not preferable because the large content of the sulfuric acid causes undesired effects such as decreases in capacitance in hot and humid conditions, deterioration of ESR or the like.

Employing the electrolytic solution for polymerization having surface tension lower than $70 \times 10^{-3}$ N/m can improve the wetting performance to the dielectric oxide film and can provide a further excellent usable rate of capacitance. The effects, however, to improve the usable rate of capacitance by adding sulfuric acid and adopting surface tension lower than $70 \times 10^{-3}$ N/m can be obtained only when the electrolytic solution for polymerization containing compound (II) is employed. On the other hand, alkyl-naphthalenesulfonic acid added in the electrolytic solution for polymerization will achieve no effects to improve the usable rate of capacitance. The result may be caused by a difference in polymerization conditions of the conductive polymer, or by a difference in easier concentration of the conductive polymer on pit edges of rough surface valve metal due to the difference in dopants.

Applying voltages on an external terminal and an anode composed of valve metal respectively during electrolytic polymerization can provide the solid electrolytic capacitor with an even higher usable rate of capacitance, and excellent impedance and leakage current characteristics at high frequencies.

The fact is thought that voltages applied on the anode composed of valve metal to form conductive polymer will attract anion dopants easily to surfaces of dielectric oxide films provided on the valve metal, causing internal fine pits of a rough surface of the valve metal to be filled with conductive polymer with a high electrical conductivity, resulting in the solid electrolytic capacitor having an excellent usable rate of capacitance as well as excellent impedance characteristics at high frequencies. Additionally, the reduction of leakage current is supposed due to dielectric oxide films formed at the same time of applying voltages on valve metal.

By adding organic solvents or nonionic surfactants to control the surface tension of electrolytic solution for polymerization to lower than $70 \times 10^{-3}$ N/m, the solid electrolytic capacitor is provided with excellent leakage current characteristics and excellent impedance characteristics at high frequencies. Especially, polymerization reactions on edge portions are restrained, enabling improvement of surface conditions of formed conductive polymers. The nonionic surfactants are as follows: acetylglycol surfactants, silicone surfactants, polyoxyalkyleneglycol surfactants, fluoro-surfactants or the like.

Ionic surfactants, however, used as additives to lower the surface tension are apt to coordinate in conductive polymers easily, causing poor impedance characteristics at high frequencies and little effects on reduction in leakage currents due to no restraint on polymerization reaction on edges.

Phenol derivatives added in electrolytic solution for polymerization can provide a conductive polymer with a stable film quality.

In another manufacturing method using compound (II) of the present invention, the phenol derivatives should preferably be selected from at least one of: nitrophenol, cyanophenol, hydroxybenzoic acid and hydroxyphenol and the concentration of phenol derivatives in electrolytic solution for polymerization should preferably range from 0.001 to 0.2 mol. Enhancing the order of polymer skeleton, the phenol derivative can provide the solid electrolyte with a further excellent ESR and capacitance characteristics in hot and humid conditions.

The concentration of phenol derivatives in electrolytic solution for polymerization smaller than 0.001 mol will cause decreases in heat resistance owing to a lower degree of order of the formed polymer. On the contrary, the concentration of phenol derivatives in the electrolytic solution for polymerization greater than 0.2 mol is not preferable because polymerizing current concentrates on edges due to a faster polymerization rate, causing an uneven polymer thickness, thereby causing decrease in leakage current characteristics owing to stresses occurring when the capacitor elements are layered.

The solid electrolytic capacitor disclosed in the present invention comprises: a dielectric oxide film; a solid electrolyte layer composed of conductive polymer; and a cathode layer formed sequentially on an anode made from valve metal, wherein the conductive polymer includes at least compound (I) as a dopant.

As dopants having carboxyl group carry out good forming, the doped compound (I) can provide a solid electrolytic capacitor with excellent leakage current characteristics and other characteristics under hot and humid environments. Moreover, the solid electrolytic capacitor comprising: a dielectric oxide film; a solid electrolyte layer composed of conductive polymer; and a cathode layer formed sequentially on an anode made from valve metal, is prepared by electrolytic polymerization using solution involving water as solvent for polymerization. The solution contains at least a monomer, compound (II) and sulfuric acid, wherein the molar concentration ratio of compound (II) to sulfuric acid ranges from 50:1 to 4:1, and the surface tension is lower than $70 \times 10^{-3}$ N/m. The method can provide a solid electrolytic capacitor with a high usable rate of capacitance.

The solid electrolytic capacitor disclosed in the present invention is described with reference to the examples but the present invention is not so limited to the examples.

FIG. 1 shows a schematic cross-sectional view of the solid electrolytic capacitor used in the examples of the present invention. Etched aluminum foil or sintered tantalum with a lead wire is used as anode 1, and dielectric oxide film 2 is formed on a surface of anode 1. Subsequently, solid electrolyte 3 composed of conductive polymer is formed and cathode terminal section composed of carbon layer 4 and silver layer 5 is formed. Then, by packaging externally using epoxy resin (not shown) the solid electrolytic capacitors described in the examples are prepared.

Next, the examples are explained specifically. Compound (I) (m=2 and n=1) is used in examples 1 through 4.

EXAMPLE 1

Etched aluminum foil having dimensions of 3 mm × 4 mm attached with a lead wire is used as an anode. Dielectric oxide film 2 is formed on a surface of the etched aluminum foil by dipping the etched aluminum foil into solution involving water containing 3% of ammonium adipate for anodization at 12V and at the solution temperature 70° C. for 60 minutes. After dipping anodized etched aluminum foil 1 in solution involving water containing 30% manganese nitrate, anodized etched aluminum foil 1 is pulled out of the solution for air drying, and is finally processed for thermal decomposition at 300° C. for 10 minutes to form manganese oxide composing a part of solid electrolyte 3.

Then, solution involving water for polymerization composed of 0.5 mol/L of ethylenedioxythiophene monomer and 0.1 mol/L of compound (I) (m=2, n=1) is prepared to form the solid electrolyte. A terminal to initiate polymerization is placed close to a surface of the etched aluminum foil to form the solid electrolyte 3 at 2 V and solution temperature of 25° C. in the electrolytic solution for polymerization. The content of compound (I) (m=2 and n=1) to 1 mol of monomer composing the conductive polymer in solid electrolyte 3 is 0.3 mol.

Subsequently, a coated carbon is dried to form carbon layer 4 on the solid electrolyte and then a coated silver paste is dried to form silver layer 5 on carbon layer 4, forming a cathode terminal section using both of the two layers. Then, with packaging externally using epoxy resin (not shown) 10 pieces of solid electrolytic capacitors with the ratings of 6.3V, 10 µF are prepared.

EXAMPLE 2

By a method similar to example 1, the etched aluminum foil is anodized to form dielectric oxide film 2. The anodized etched aluminum foil is immersed in solution involving water containing 5% of water-soluble polyaniline, and is then heat-treated at 200° C. for 10 minutes to form a conductive polymer composing a part of the solid electrolyte 3. Then, solution involving water as solvent for polymerization dissolving a 0.5 mol/L of pyrrole monomer and a 0.1 mol/L of compound (I) (m=2, n=1) is prepared to form the solid electrolyte.

The solid electrolytic capacitor is prepared under conditions similar to example 1 except the condition of solution involving water as solvent for polymerization.

EXAMPLE 3

By a method similar to example 1, a manganese oxide film composing a part of the solid electrolyte is formed on a surface of the anodized etched aluminum foil. Then, solution involving ethanol for polymerization dissolving a 0.5 mol/L of ethylenedioxythiophene monomer and a 0.1 mol/L of compound (I) (m=2, n=1) is prepared to form the solid electrolyte.

The solid electrolytic capacitor is prepared under conditions similar to example 1 except the condition of solution for polymerization.

EXAMPLE 4

By a method similar to example 1, the etched aluminum foil is anodized to form dielectric oxide film 2. Then the anodized etched aluminum foil is immersed in a 1.0% polyethylenedioxythiophene water-alcohol mixed solution containing 1% of compound (I) (m=2, n=1) and 3% of binder component. After pulling out of the solution, the anodized etched aluminum foil is dried at 150° C. for 5 minutes to form a layer of sulfonated polyethylenedioxythiophene.

Subsequently, the anodized etched aluminum foil is immersed in solution involving water as solvent containing: 0.5 mol/L of ethylenedioxythiophene, a heterocyclic monomer; 1 mol/L of p-ferric toluenesulfonate, an oxidant; and 2 mol/L of n-butanol, a polymerizing solvent. After pulling out of the solution, the anodized etched aluminum foil is left at 85° C. for 60 minutes to form a solid electrolyte composed of polyethylenedioxythiophene that is a chemically polymerized conductive polymer. The solid electrolytic capacitor is prepared under conditions similar to example 1 except the above.

COMPARATIVE EXAMPLE 1

By a method similar to example 1, a dielectric oxide film is formed on an outer surface of an etched aluminum foil to act as an anode, then a conductive pre-coat composing a part of the solid electrolyte is formed by heat treatments. Subsequently, solution involving water for polymerization dissolving 0.5 mol/L of pyrrole monomer and 0.1 mol/L of sodium butylnaphthalenesulfonic acid is prepared to form solid electrolytes. A terminal to initiate polymerization is placed close to a surface of the element to form the solid electrolyte at solution temperature of 25° C. and at polymerization voltage of 2 V in the electrolytic solution for polymerization. Subsequently, by the method similar to example 1, a carbon layer and a silver layer are formed to make up a cathode terminal section, and then packaging externally 10 pieces of solid electrolytic capacitors are prepared.

EXAMPLE 5

Tantalum powder formed embedded such that a portion of tantalum lead wire surfaces is sintered to form an anode of 1.4 mm thick, 3.0 mm wide and 3.8 mm long. The anode is immersed in aqueous phosphoric solution to form a dielectric oxide film on the anode surface by applying 20 V for a forming (anodizing) reaction.

Subsequently, the anode is immersed for 5 minutes in aqueous ethylene glycol solution dissolving pyrrole, a heterocyclic monomer, and compound (I) (m=2, n=1). After pulling out of the solution, the anode is immediately immersed for 10 minutes in oxidizing solution composed of ethylene glycol solution involving water dissolving ferrous sulfate (III), an oxidant. Then, pulling out of the oxidizing solution, the anode is washed for forming for restoration and is dried at 100° C. Repeating 10 times of serial operations from immersing in the electrolytic solution for polymerization to the forming for restoration, a solid electrolyte composed of conductive polymer is formed.

Next, a surface of the solid electrolyte is impregnated with solution involving water containing 2 wt % of carbon particles and 2 wt % of pyrogallol and prepared to pH10 by adding ammonia, and is dried at 150° C. to form a carbon layer. A conductive silver paste layer is then applied on the carbon layer to make up the capacitor element.

Next, the tantalum lead wire is connected to the anode terminal and a cathode terminal is connected to the cathode of a capacitor element via a conductive adhesive. The solid electrolytic capacitor is finished after covering the whole with a packaging resin such that portions of the anode and cathode terminals are exposed (D size: 7.3×4.32×2.8 mm).

COMPARATIVE EXAMPLE 2

By a method similar to example 5, a dielectric oxide film is formed on the anode composed of tantalum. In this comparative example 2, to form the solid electrolyte, the anode provided with the dielectric oxide film is once immersed into solution for polymerization for 5 minutes, and is then pulled out of the solution. The solution is ethylene glycol solution involving water as solvent containing pyrrole, a heterocyclic monomer, and sodium butylnaphthalenesulfonic acid. The solid electrolytic capacitor is prepared under conditions similar to example 5 except the above conditions (D size: 7.3×4.3×2.8 mm).

(Measurements of ESR values and capacitances)

Table 1 shows initial characteristics and ESR values after humidity testing (60° C., 90%, 6.3 V and 500 hrs.) of the solid electrolytic capacitors described in examples 1 through 5 and comparative examples 1 and 2. ESR values are measured at 100 kHz.

TABLE 1

|  | ESR (mΩ) | | Capacitance (μF) |
|---|---|---|---|
|  | Initial | After test | Initial |
| Example 1 | 53 | 62 | 10.2 |
| Example 2 | 58 | 68 | 10.5 |
| Example 3 | 55 | 80 | 10.5 |
| Example 4 | 58 | 85 | 10.0 |
| Example 5 | 86 | 99 | 20.4 |
| Comparison 1 | 54 | 256 | 7.9 |
| Comparison 2 | 95 | 112 | 17.3 |

Table 1 shows clearly that ESR characteristics in comparative example 1 become worse significantly after the humidity test compared with those in examples 1 through 4. This proves that compound (I) performs good forming for aluminum, while sodium butylnaphthalenesulfonic acid, used as a dopant, has a great influence to decrease ESR characteristics in humidity testing.

The comparison between example 1 and example 2 shows that a water-soluble polyaniline to act as a conductive polymer composing the solid electrolyte can provide equivalent ESR characteristics.

Comparison between example 1 and example 3 proves that water is an effective base solvent, as ESR characteristics after humidity testing tend to be worse with electrolytic solution for polymerization using solution involving ethanol.

Moreover, the solid electrolytes prepared in example 4 using a chemical polymerization with an oxidant cannot have ESR characteristics equivalent to example 1. This proves that electrolytic polymerization is superior to chemical polymerization to provide the solid electrolytic capacitor with excellent properties. Additionally, the comparisons between example 1 and comparative example 1, and between example 5 and comparative example 2 prove that bulky dopant such as sodium butylnaphthalenesulfonic acid causes a significant decrease in initial capacitances owing to difficulties to produce orderly conductive polymers.

EXAMPLE 6

In example 2, 10 pieces each of the solid electrolytic capacitors are prepared by a method similar to example 2 except content of compound (I) to 1 mol of monomer composing conductive polymer varied to 0.001, 0.01, 0.05, 0.1, 0.5, and 0.7 mol respectively.

TABLE 2

| Content of compound (I) (mol) | Initial ESR (mΩ) |
|---|---|
| 0.001 | 96 |
| 0.01 | 71 |
| 0.05 | 33 |
| 0.1 | 30 |
| 0.5 | 34 |
| 0.7 | 59 |

Figure 2:
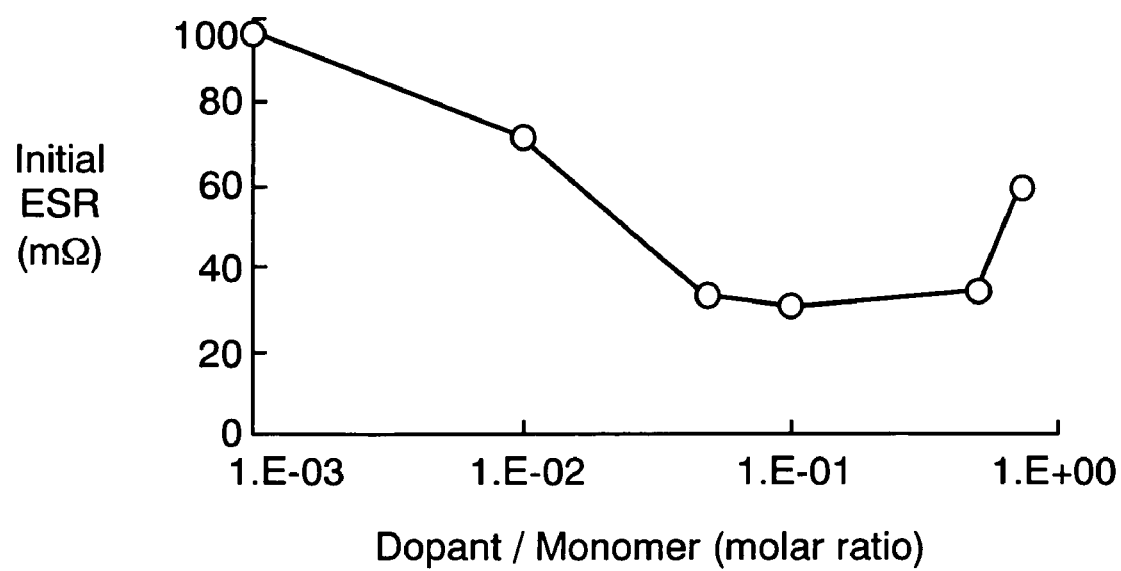
FIG. 2 illustrates a characteristic showing a relation between the content of dopant vs ESR.

Table 2 and FIG. 2 show the relation between content of compound (I) and initial ESR values of the solid electrolytic capacitors. ESR values are measured at 100 kHz.

FIG. 2 proves clearly that solid electrolytic capacitors have excellent ESR characteristics with the content of compound (I) to 1 mol of monomer composing conductive polymer ranging from 0.05 to 0.5 mol, but the ESR characteristics tend to be worse with the content of less than 0.05 mol or more than 0.5 mol. Therefore, to enable the solid electrolytic capacitors to have further excellent ESR and impedance characteristics by using compound (I), the content of compound (I) to 1 mol of monomer composing conductive polymer should preferably be controlled in a range from 0.05 to 0.5 mol.

EXAMPLE 7

In example 1, 10 pieces each of the solid electrolytic capacitors are prepared by the method similar to example 1 except content of p-nitrophenol into the electrolytic solution for polymerization varied to 0.001, 0.005, 0.01, 0.05, 0.1, and 0.2 mol respectively for forming solid electrolytes with p-nitrophenol contained in conductive polymer partially.

TABLE 3

| Content (mol) | Initial ESR (mΩ) | ESR after 1000 hrs. (mΩ) |
|---|---|---|
| 0 | 30 | 188 |
| 0.001 | 28 | 110 |
| 0.005 | 29 | 80 |
| 0.01 | 30 | 37 |
| 0.05 | 33 | 38 |
| 0.1 | 30 | 35 |
| 0.2 | 70 | 85 |

Figure 3:
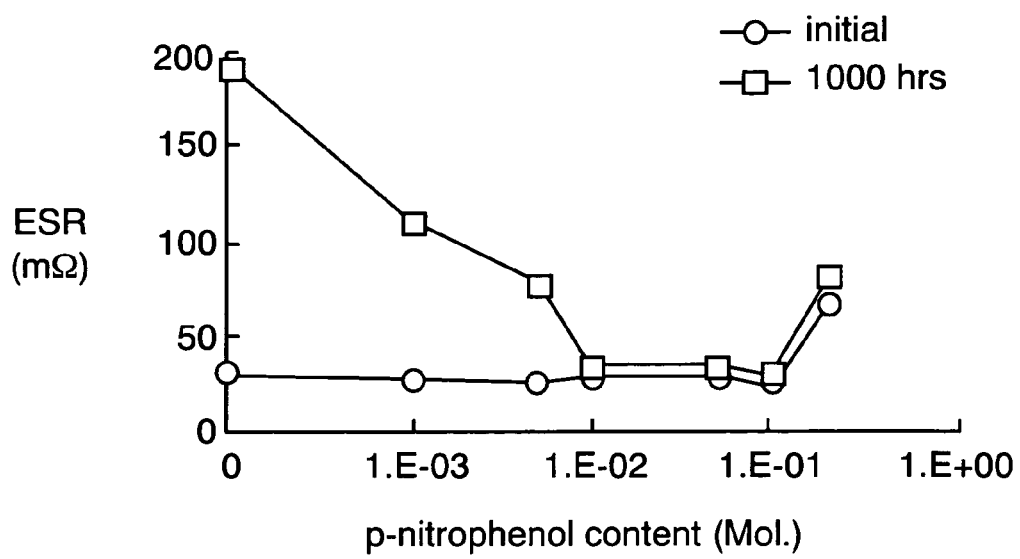
FIG. 3 illustrates characteristics showing relations between the content of p-nitrophenol in electrolytic solution for polymerization vs ESR.

Table 3 and FIG. 3 shows ESR characteristics initial and after a hot no-load test (125° C., 1000 hours). ESR values are measured at 100 kHz.

EXAMPLE 8

In example 1, 10 pieces each of the solid electrolytic capacitors are prepared by a method similar to example 1 except content of sulfuric acid to the electrolytic solution for polymerization varied to 0.005, 0.01, 0.1, 1.0, 1.5 and 2.0 wt % respectively for forming solid electrolytes with sulfuric acid contained in conductive polymer partially.

Figure 4:
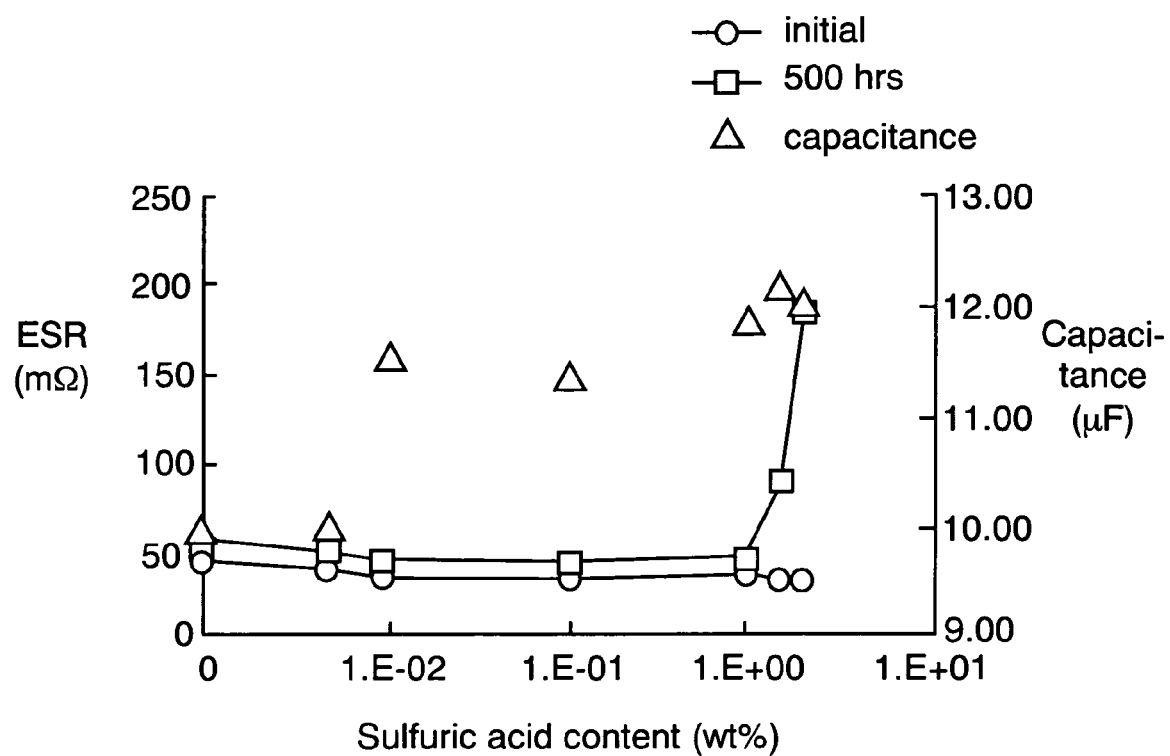
FIG. 4 illustrates characteristics showing relations between the content of sulfuric acid in electrolytic solution for polymerization vs capacitance or ESR.

Table 4 and FIG. 4 show initial capacitance characteristics and ESR values initially and after a humidity test (60° C., 90%, 6.3 V, 500 hours) of the solid electrolytic capacitors. Capacitances are measured at 120 kHz, and ESR values are measured at 100 kHz. In FIG. 4, the right-hand vertical axis represents capacitance, the left-hand vertical axis represents ESR values and the horizontal axis represents content of sulfuric acid.

TABLE 4

| Content (wt %) | Initial ESR (mΩ) | ESR after 500 hrs. (mΩ) | Capacitance (μF) |
|---|---|---|---|
| 0 | 45 | 55 | 10.01 |
| 0.005 | 40 | 50 | 10.05 |
| 0.01 | 36 | 44 | 11.56 |
| 0.1 | 37 | 45 | 11.39 |
| 1 | 37 | 48 | 11.89 |
| 1.5 | 34 | 90 | 12.19 |
| 2 | 34 | 185 | 12.02 |

FIG. 3 proves clearly that the solid electrolytic capacitors with content of p-nitrophenol ranging from 0.01 to 0.1 mol have excellent ESR characteristics and that the ESR characteristics tend to be worse with the content of less than 0.01 mol or more than 0.1 mol. To provide, therefore, the solid electrolytic capacitors with stable characteristics even under hot conditions by adding p-nitrophenol and causing to heighten the order of polymer skeleton, the content of p-nitrophenol should preferably range from 0.01 to 0.1 mol.

The following additives, instead of p-nitrophenol, have been evaluated as showing similar effects: p-cyanophenol, p-hydroxybenzoic acid and p-hydroxyphenol.

FIG. 4 proves clearly that the solid electrolytic capacitors with 0.01 to 1 wt % of sulfuric acid have excellent capacitance characteristics as well as properties under high humidity. The capacitances show poor values with the sulfuric acid content of less than 0.01 wt %, and contrarily, ESR characteristics tend to be worse in humidity tests with sulfuric acid content of more than 1 wt %. Therefore, to provide the solid electrolytic capacitor with an increased usable rate of capacitance as well as a high moisture resistance by improving the filling ratio of formed polymer, the content of sulfuric acid should preferably range from 0.01 to 1 wt %.

EXAMPLE 9

In example 1, 10 pieces each of the solid electrolytic capacitors are prepared by a method similar to example 1 except content of 2-propanol into the solution for polymerization varied to 0.1, 0.5, 1, 10, 20, and 30 wt % respectively for forming solid electrolytes.

Figure 5:
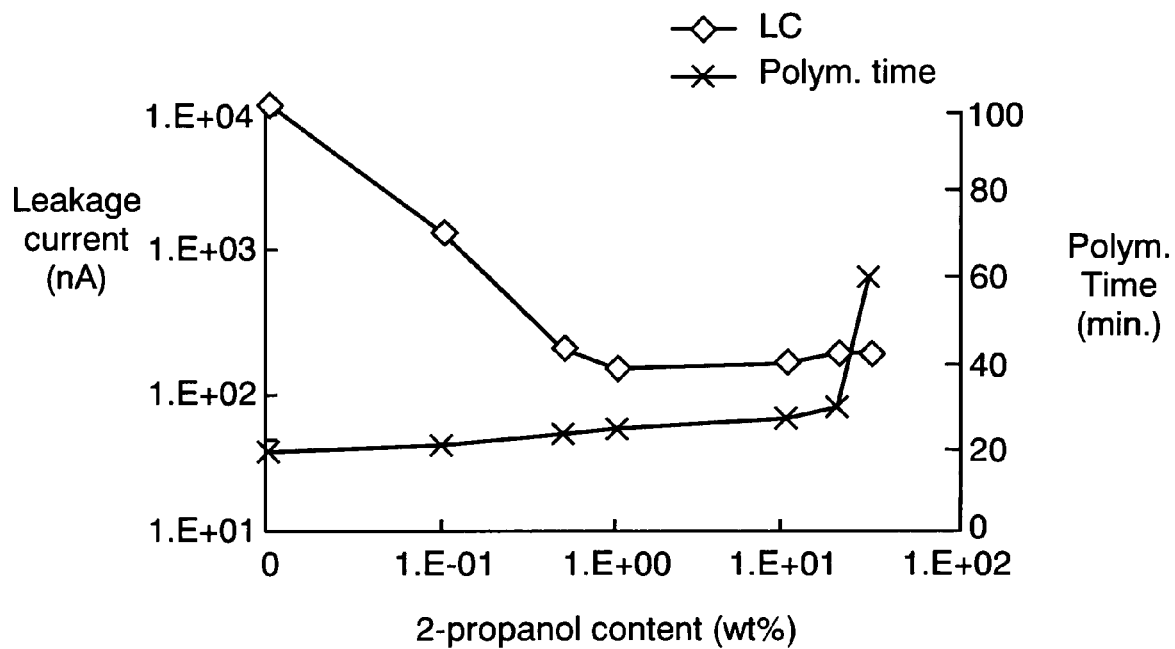
FIG. 5 illustrates characteristics showing relations between the content of 2-propanol in electrolytic solution for polymerization vs leakage current or polymerization time.

Table 5 and FIG. 5 show initial leakage current characteristics (6.3 V, 1 minute value) of the solid electrolytic capacitors. In FIG. 5, the right-hand vertical axis represents polymerizing time, the left-hand vertical axis represents leakage currents, and the horizontal axis represents content of 2-propanol.

FIG. 5 proves clearly that the solid electrolytic capacitors with 2-propanol content ranging from 0.5 to 20 wt % have excellent leakage current characteristics. The leakage current characteristics tend to be worse with the content of less than 0.5 wt %. Contrarily, 2-propanol content of more than 20 wt % causes a longer polymerizing time owing to poorer polymerization reactions. To provide, therefore, the solid electrolytic capacitors with excellent leakage current characteristics by doping organic solvents such as alcohols into the electrolytic solution for polymerization to restrain the polymerization reaction, preventing currents from concentrating on edges, thereby improving surface conditions of conductive polymer, 2-propanol content should preferably range from 0.5 to 20 wt %.

TABLE 5

| Content (wt %) | Leakage current (nA) | Polymerizing time (min) |
|---|---|---|
| 0 | 9900 | 20 |
| 0.1 | 1300 | 21 |

TABLE 5-continued

| Content (wt %) | Leakage current (nA) | Polymerizing time (min) |
|---|---|---|
| 0.5 | 200 | 24 |
| 1 | 150 | 25 |
| 10 | 160 | 28 |
| 20 | 190 | 30 |
| 30 | 190 | 60 |

The following organic solvents instead of 2-propanol have been estimated as capable of providing the similar effects: methyl alcohol, ethyl alcohol, n-propyl alcohol, n-butyl alcohol, 2-butyl alcohol, tert-butyl alcohol, acetonitrile, acetone tetrahydrofuran, ethylene glycol, 7-butyl lactone dimethyl formamide and dimethyl sulfoxide.

EXAMPLE 10

In example 1, 10 pieces each of the solid electrolytic capacitors are prepared by a method similar to example 1 except polymerization voltages varied to 0.5, 1, 2, 3 and 5 V respectively for electrolytic polymerization.

Figure 6:
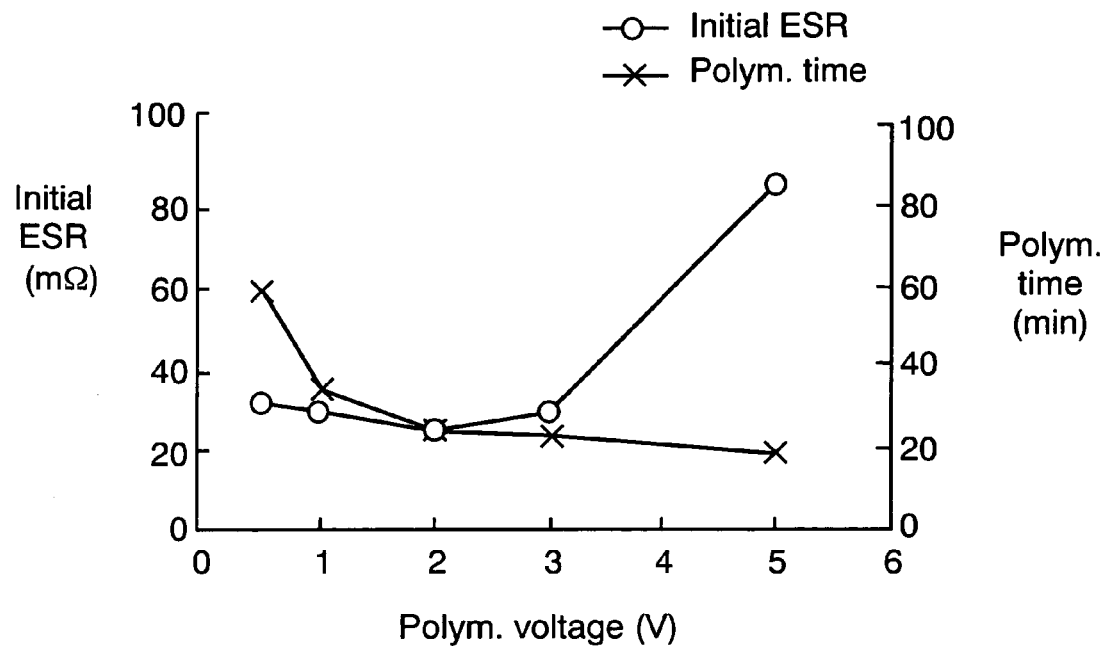
FIG. 6 illustrates characteristics showing relations between the electrolytic polymerization voltage vs ESR or polymerization time.

Table 6 and FIG. 6 show initial ESR characteristics. ESR values are measured at 100 kHz. In FIG. 6, the right-hand vertical axis represents polymerizing time, the left-hand vertical axis represents initial ESR values, and the horizontal axis represents polymerization voltages.

TABLE 6

| Voltage (V) | ESR value (mΩ) | Polymerization time (min) |
|---|---|---|
| 0.5 | 32 | 60 |
| 1 | 30 | 35 |
| 2 | 25 | 25 |
| 3 | 29 | 24 |
| 5 | 65 | 19 |

FIG. 6 proves that the solid electrolytic capacitors prepared by polymerization voltage ranging from 1 to 3 V have excellent ESR characteristics. Polymerization rates decrease with applied voltages lower than 1 V. Contrarily, ESR characteristics tend to be worse with the voltages higher than 3 V as orderly polymers are not formed. To provide the solid electrolytic capacitor, therefore, with excellent ESR characteristics by controlling the polymerization voltages to restrain the reactivity of polymerization, the polymerization voltages should preferably range from 1 to 3 V.

EXAMPLE 11

Etched aluminum foil of 3 mm × 4 mm attached with a lead wire is used as an anode. Dielectric oxide film 2 is formed on a surface of the etched aluminum foil by dipping the etched aluminum foil into solution involving water as solvent containing 3% of ammonium adipate to anodize at 6V and at solution temperature of 70° C. for 60 minutes. Then, the anodized etched aluminum foil 1 is dipped in solution involving water as solvent containing 30 % manganese nitrate and is pulled out of the solution for air drying, and is finally processed for thermal decomposition at 300° C. for 10 minutes to form manganese oxide composing a part of solid electrolyte 3.

Next, a solid electrolyte is formed on the manganese oxide. First, solution involving water as solvent for polymerization dissolving 0.5 mol/L of ethylenedioxythiophene monomer, 0.1 mol/L of compound (II) having each of hydroxyl group and sulfonic group as substituents, and 0.01 mol/L of sulfuric acid, further added by ethyl alcohol to control the surface tension to $60 \times 10^{-3}$ N/m, is prepared to form the solid electrolyte. An external terminal to initiate polymerization is placed close to a surface of the etched aluminum foil to form the solid electrolyte at solution temperature of 25° C. and at polymerizing voltage of 2.5 V in the solution. At the time of forming the solid electrolyte, 5 V is applied on the anode composed of etched aluminum foil simultaneously. 10 pieces of solid electrolytic capacitors with the ratings of 2.5 V, 20 µF are prepared under conditions similar to example 1 except the above conditions.

EXAMPLE 12

In example 11, solution involving water as solvent for polymerization dissolving a 0.1 mol/L of compound (II) having one hydroxyl group and two sulfonic groups as substituents, and a 0.01 mol/L of sulfuric acid, further added by propyl alcohol to control the surface tension to $60 \times 10^{-3}$ N/m, is prepared to form the solid electrolyte. The solid electrolytic capacitor is prepared by a method similar to example 11 except that an external terminal to initiate polymerization is placed close to a surface of the etched aluminum foil to form the solid electrolyte by electrolytic polymerization reactions at 2 V in the electrolytic solution for polymerization.

EXAMPLE 13

In example 11, after forming the dielectric oxide film, the anodized etched aluminum foil is immersed in solution involving water as solvent containing 5% of water-soluble polyaniline, and is then heat-treated at 200° C. for 5 minutes to form a conductive polymer composing the solid electrolyte partially. Then, solution involving water as solvent for polymerization dissolving a 0.2 mol/L of pyrrole monomer, a 0.05 mol/L of compound (II) having each one of hydroxyl group and sulfonic group as substituents, and a 0.01 mol/L of sulfuric acid, further added by n-butyl alcohol to control the surface tension to $60 \times 10^{-3}$ N/m, is prepared to form the solid electrolyte. The solid electrolytic capacitor is prepared by a method similar to example 11 except that an external terminal to initiate polymerization is placed close to a surface of the etched aluminum foil to form the solid electrolyte by electrolytic polymerization reactions at 2 V in the solution.

EXAMPLE 14

In example 11, after forming the dielectric oxide film, the anodized etched aluminum foil is immersed in solution involving water as solvent containing 5% of water-soluble polyaniline, and is then heat-treated at 200° C. for 5 minutes to form a conductive polymer composing the solid electrolyte partially. Then, solution involving water as solvent for polymerization dissolving a 0.2 mol/L of pyrrole monomer, a 0.05 mol/L of compound (II) having one sulfonic group as a substituent, and a 0.01 mol/L of sulfuric acid, further added by iso-propyl alcohol to control the surface tension to $60 \times 10^{-3}$ N/m, is prepared to form the solid electrolyte. The solid electrolytic capacitor is prepared by a method similar to example 11 except that an external terminal to initiate polymerization is placed close to a surface of the etched aluminum foil to form the solid electrolyte by electrolytic polymerization reactions at 2 V in the solution.

EXAMPLE 15

In example 11, solution involving water as solvent for polymerization dissolving a 0.2 mol/L of pyrrole monomer, a 0.05 mol/L of compound (II) having two sulfonic groups as substituents, and a 0.01 mol/L of sulfuric acid, further added by silicone surfactants to control the surface tension to $60 \times 10^{-3}$ N/M, is prepared to form the solid electrolyte. The solid electrolytic capacitor is prepared by the method similar to example 11 except that an external terminal to initiate polymerization is placed close to a surface of the etched aluminum foil to form the solid electrolyte by electrolytic polymerization reactions at 2 V in the solution.

EXAMPLE 16

With the method similar to example 11, dielectric oxide film 2 is formed on an outer surface of etched aluminum foil 1. The etched aluminum foil is immersed in solution involving water as solvent containing 5% of water-soluble polyaniline, and is then heat-treated at 200° C. for 5 minutes to form a conductive polymer composing the solid electrolyte partially. Then, solution involving water as solvent for polymerization dissolving a 0.2 mol/L of pyrrole monomer, a 0.05 mol/L of compound (II) having one sulfonic group as a substituent, and a 0.01 mol/L of sulfuric acid, further added by iso-propyl alcohol to control the surface tension to $60 \times 10^{-3}$ N/m, is prepared to form the solid electrolyte. An external terminal to initiate polymerization is placed close to a surface of the etched aluminum foil to form the solid electrolyte 3 by electrolytic polymerization reactions at 2 V in the solution.

Subsequently, a coated carbon is dried to form a carbon layer 4 on the solid electrolyte and then a coated silver paste is dried to form a silver layer 5 on the carbon layer 4, causing both two layers to form a cathode terminal section. Then, with external packaging using epoxy resin (not shown) 10 pieces of the solid electrolytic capacitors are prepared.

COMPARATIVE EXAMPLE 3

With a method similar to example 11, dielectric oxide film is formed on an outer surface of etched aluminum foil. The etched aluminum foil is immersed in solution involving water as solvent containing 5% of water-soluble polyaniline, and is then heat-treated at 200° C. for 5 minutes to form a conductive polymer composing the solid electrolyte partially. Subsequently, solution involving water as solvent for polymerization dissolving 0.2 mol/L of pyrrole monomer and 0.05 mol/L of propylnaphthalenesulfonic acid is prepared to form solid electrolytes. An external terminal to initiate polymerization is placed close to a surface of the etched aluminum foil to form the solid electrolyte 3 by electrolytic polymerization reactions at 2 V in the solution. Then, a carbon layer and a silver layer are formed to make up a cathode terminal section, and with external packaging, 10 pieces of solid electrolytic capacitors are prepared.

COMPARATIVE EXAMPLE 4

With a method similar to example 11, dielectric oxide film is formed on an outer surface of an etched aluminum foil. The etched aluminum foil is immersed in solution involving water as solvent containing 5% of water-soluble polyaniline, and is then heat-treated at 200° C. for 5 minutes to form a conductive polymer composing the solid electrolyte partially. Subsequently, solution involving water as solvent for polymerization dissolving 0.2 mol/L of pyrrole monomer and 0.05 mol/L of butylnaphthalenesulfonic acid, added by n-butyl alcohol to control the surface tension to $60 \times 10^{-3}$ N/m, is prepared to form solid electrolytes. An external terminal to initiate polymerization is placed close to a surface of the capacitor element to form the solid electrolyte by electrolytic polymerization reactions at 2 V in the solution. Then, a cathode terminal section composed of a carbon layer and a silver layer is made up, and thus 10 pieces of solid electrolytic capacitors are prepared with external packaging.

(Measurements)

Table 7 lists initial characteristics of the solid electrolytic capacitors described in examples 11 through 16 and comparative examples 3 and 4. ESR values are measured at 100 kHz.

TABLE 1

|  | Capacitance (μF) | ESR (mΩ) | Leakage current (nA) |
| --- | --- | --- | --- |
| Example 11 | 22.5 | 24 | 37 |
| Example 12 | 23.1 | 22 | 48 |
| Example 13 | 24.0 | 22 | 28 |
| Example 14 | 24.8 | 20 | 32 |
| Example 15 | 23.8 | 21 | 45 |
| Example 16 | 23.4 | 26 | 96 |
| Example 3 | 18.0 | 35 | 148 |
| Example 4 | 19.2 | 31 | 136 |

Table 7 proves that from the comparison between examples 11 through 16 and comparative example 3, the solid electrolytic capacitors can be provided with excellent capacitance characteristics by using compound (II) and sulfuric acid as dopants to control the surface tension of the electrolytic solution for polymerization to lower than $70 \times 10^{-3}$ N/m, and that from the comparison between example 13 and comparative example 4, compound (II) and sulfuric acid used as dopants can provide an exclusively excellent usable rate of capacitance.

Moreover, it is also proved, from the comparison between example 14 and example 16, that the solid electrolytic capacitors can be provided with a high usable rate of capacitance as well as excellent impedance and leakage current characteristics at high frequencies by applying voltages on an external electrode and a valve metal respectively during electrolytic polymerization reactions.

EXAMPLE 17

In example 14, 10 pieces each of the solid electrolytic capacitors are prepared by a method similar to example 14 except content of sulfuric acid to compound (II) varied to 100:1, 50:1, 10:1, 5:1, 4:1, and 2:1 in molar ratio respectively.

Figure 7:
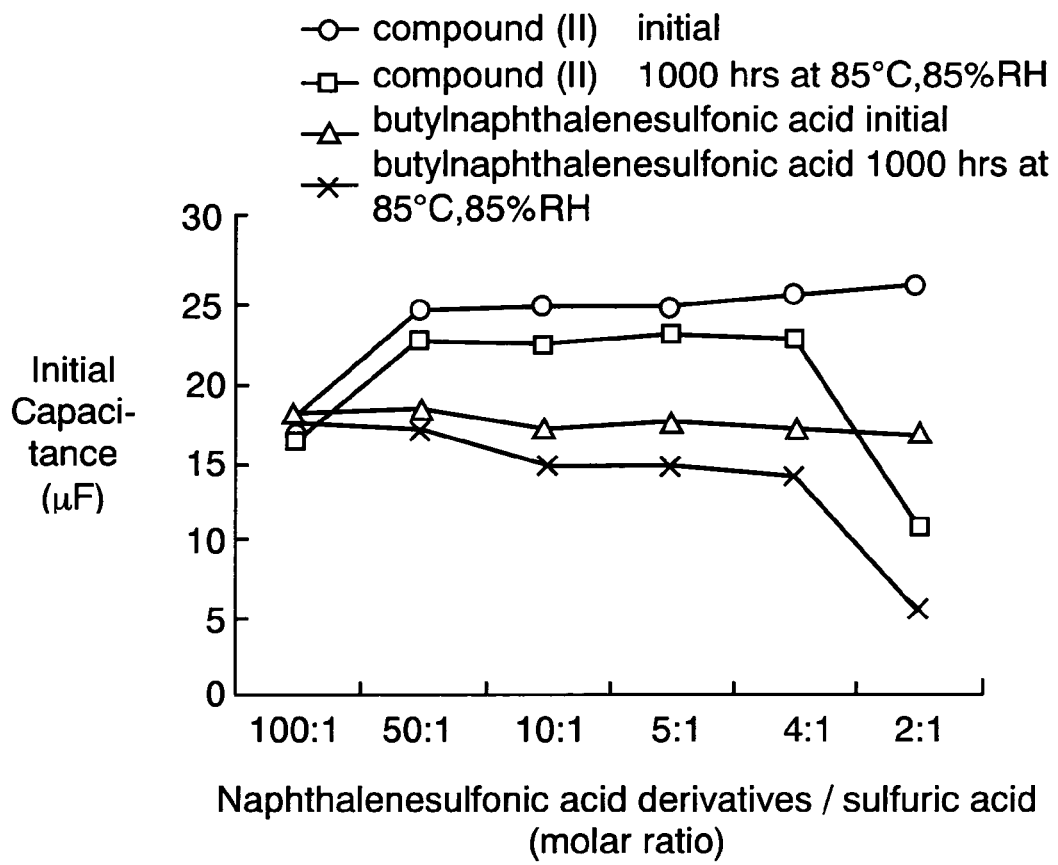
FIG. 7 illustrates characteristics showing relations between the molar concentration ratio of dopant to sulfuric acid vs capacitance.

FIG. 7 shows the capacitance characteristics of the solid electrolytic capacitors initially and after 1000 hours-aging at 85° C. and 85% rated voltage.

COMPARATIVE EXAMPLE 5

In example 14, 10 pieces each of the solid electrolytic capacitors are prepared by a method similar to example 14 except content of sulfuric acid to butylnaphthalenesulfonic acid, replacing compound (II), varied to 100:1, 50:1, 10:1, 5:1, 4:1, and 2:1 in molar ratio respectively.

FIG. 7 shows capacitance characteristics of the solid electrolytic capacitors initially and after 1000 hours-aging at 85° C. and 85% rated voltage.

FIG. 7 proves clearly that the solid electrolytic capacitors have excellent initial capacitance characteristics when sulfuric acid is added to 50:1 or higher in concentration ratio against compound (II). However, the capacitance tends to decrease significantly with the sulfuric acid concentration ratio of 4:1 or higher. The undoping of sulfuric acid in hot and humid environments and corrosion affected by the sulfuric acid would cause the decrease in capacitance.

Sulfuric acid can provide an excellent usable rate of capacitance exclusively when used with compound (II). As shown in comparative example 5, therefore, naphthalenesulfonic acids having alkyl groups such as butylnaphthalenesulfonic acid cannot improve the usable rate of capacitance even if sulfuric acid is added or surface tension is controlled to lower than $70 \times 10^{-3}$ N/m. These naphthalenesulfonic acids are thought so surface-active that polymers are apt to be formed concentrated on pit edges of rough surfaces of the valve metal.

To provide, therefore, solid electrolytic capacitors with an excellent initial usable rate of capacitance, the molar concentration ratio of compound (II) in the electrolytic solution for polymerization should preferably be 50:1 or higher and the electrolytic solution for polymerization should have a surface tension of lower than $70 \times 10^{-3}$ N/m. To provide the solid electrolytic capacitors with little decrease in properties in hot and humid conditions, molar concentration ratio of sulfuric acid against compound (II) in the solution should preferably be controlled to lower than 4:1.

EXAMPLE 18

In example 13, 10 pieces each of the solid electrolytic capacitors are prepared by a method similar to example 13 except content of n-butyl alcohol to control surface tensions of the electrolytic solution for polymerization varied to $40 \times 10^{-3}$, $50 \times 10^{-3}$, $55 \times 10^{-3}$, $60 \times 10^{-3}$, $65 \times 10^{-3}$, $70 \times 10^{-3}$ and $73 \times 10^{-3}$ N/m respectively.

Figure 8:
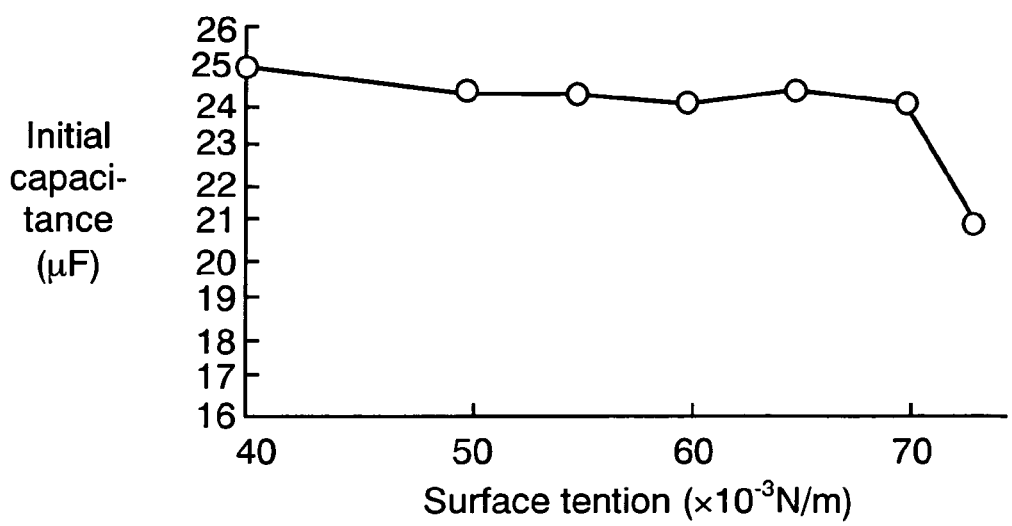
FIG. 8 illustrates a characteristic showing a relation between the surface tension vs capacitance.

FIG. 8 shows initial capacitance characteristics of the solid electrolytic capacitor. FIG. 8 proves clearly that the solid electrolytic capacitor can be provided with excellent capacitance characteristics with surface tension of the electrolytic solution for polymerization of lower than $70 \times 10^{-3}$ N/m.

The following organic solvents can replace 2-propanol to control the surface tension of electrolytic solution for polymerization to lower than $70 \times 10^{-3}$ N/m: methyl alcohol, ethyl alcohol, n-propyl alcohol, n-butyl alcohol, 2-butyl alcohol, 3-butyl alcohol, tert-butyl alcohol, acetonitrile, acetone, tetrahydrofuran, ethylene glycol and y-butyl lactone. Additionally, the following nonionic surfactants have been estimated as capable of providing similar effects: acetyl glycol surfactants, silicone surfactants, polyoxyalkylene glycol surfactants and fluoro-surfactants.

EXAMPLE 19

In example 14, 10 pieces each of the solid electrolytic capacitors are prepared by a method similar to example 14 except content of p-nitrophenol in the electrolytic solution for polymerization varied to 0.001, 0.005, 0.01, 0.05, 0.1, 0.2 and 0.3 mol respectively to include p-nitrophenol into the conductive polymer partially.

Figure 9:
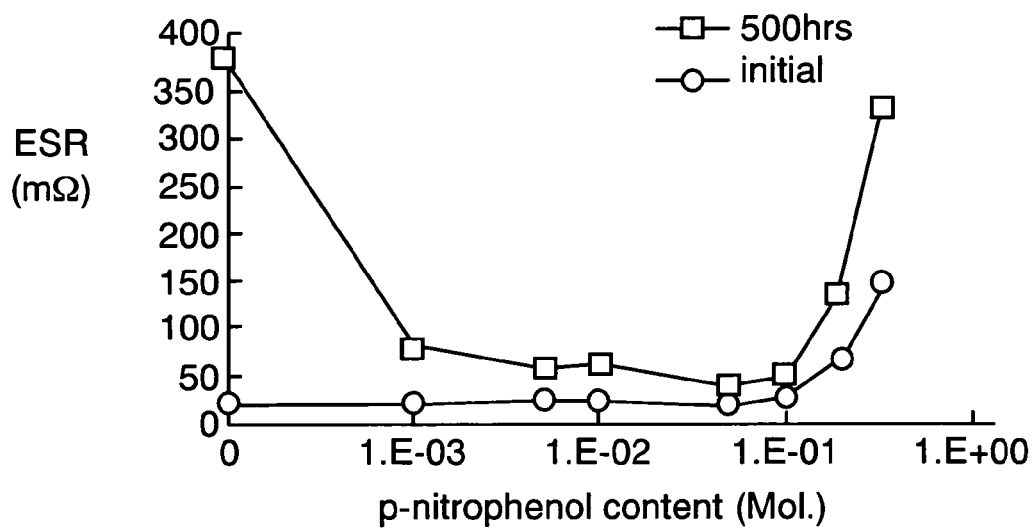
FIG. 9 illustrates characteristics showing relations between the content of p-nitrophenol in electrolytic solution for polymerization vs ESR.

FIG. 9 shows ESR characteristics initially and after a hot and no-load test (125° C., 500 hours). ESR values are measured at 100 kHz.

FIG. 9 proves clearly that solid electrolytic capacitors with a content of p-nitrophenol ranging from 0.001 to 0.2 mol have excellent ESR characteristics. The ESR characteristics, however, tend to be worse with the content of less than 0.001 mol or more than 0.2 mol. To provide, therefore, the solid electrolytic capacitors with stable characteristics even under hot conditions by adding p-nitrophenol, causing the order of polymer skeleton to enhance, the content of p-nitrophenol should preferably range from 0.001 to 0.2 mol.

Additionally, the following organic solvents instead of p-nitrophenol have been estimated as capable of providing the similar effects: p-cyanophenol, p-hydroxybenzoic acid and p-hydroxyphenol.

EXAMPLE 20

Figure 10:
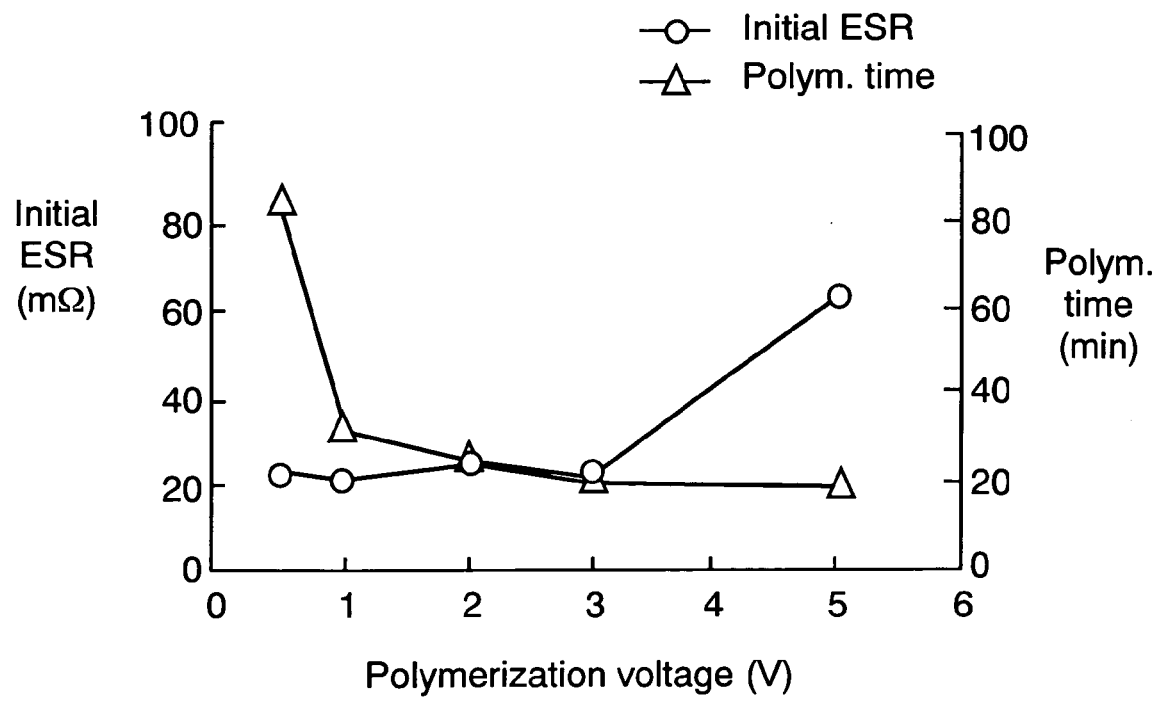
FIG. 10 illustrates characteristics showing relations between the electrolytic polymerization voltage vs ESR or polymerization time.

In example 11, 10 pieces each of the solid electrolytic capacitors are prepared by a method similar to example 11 except applying voltages for the electrolytic polymerization varied to 0.5, 1, 2, 3 and 5 V respectively, FIG. 10 shows initial ESR characteristics of the solid electrolytic capacitor. ESR values are measured at 100 kHz. In FIG. 10, the right-hand vertical axis represents polymerizing time, the left-hand vertical axis represents initial ESR values, and the horizontal axis represents polymerization voltages.

FIG. 10 proves that the solid electrolytic capacitors prepared by polymerization voltages ranging from 1 to 3 V have excellent ESR characteristics. Polymerization reactions do not proceed rapidly with applied voltages lower than 1 V. Contrarily, ESR characteristics tend to be worse with the voltages higher than 3 V as orderly polymers are not formed. To provide the solid electrolytic capacitor, therefore, with excellent ESR characteristics by controlling the applying voltages to restrain the polymerization reaction, the polymerization voltages should preferably range from 1 to 3 V.

In the aforementioned examples, the solid electrolytic capacitor with a valve metal of aluminum or tantalum used as an anode is described exclusively. The present invention is not so limited but is susceptible to various materials having oxide films on outer surfaces to perform as a valve metal such as niobium or titanium capable of providing similar effects.

INDUSTRIAL APPLICABILITY

The present invention can provide a solid electrolytic capacitor with low impedance at high frequencies, a compact size and a large capacitance that is required along with the digitalization of electronic equipment.

The invention claimed is:

1. A solid electrolytic capacitor comprising:
    an anode composed of a valve metal;
    a dielectric oxide film formed on a surface of the anode;
    a solid electrolyte composed of a conductive polymer formed on the dielectric oxide film; and
    a cathode formed on the solid electrolyte;
    wherein the solid electrolyte includes naphthalenesulfonic acid compounds; and
    wherein the solid electrolyte is formed by an electrolytic polymerization or a chemical polymerization of the conductive polymer; the naphthalenesulfonic acid compounds correspond to compound (I); and the compound (I) is doped into the conductive polymer

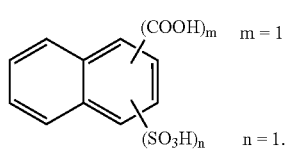 (I)

2. The solid electrolytic capacitor of claim 1, wherein a content of the compound (I) to 1 mol of monomer forming the conductive polymer ranges from 0.05 to 0.5 mol.

3. The solid electrolytic capacitor of claim 1, wherein the conductive polymer is selected from at least one of pyrrole, thiophene, furan, aniline and their derivatives.

4. The solid electrolytic capacitor of claim 1, wherein the solid electrolyte further contains a phenol derivative.

5. The solid electrolytic capacitor of claim 4, wherein the phenol derivative is selected from at least one of nitrophenol, cyanophenol, hydroxy-benzoic acid, and hydroxyphenol.

6. The solid electrolytic capacitor of claim 1, wherein the solid electrolyte further contains a sulfuric acid.

7. A solid electrolytic capacitor comprising:
an anode composed of a valve metal;
a dielectric oxide film formed on a surface of the anode;
a solid electrolyte composed of a conductive polymer formed on the dielectric oxide film; and
a cathode formed on the solid electrolyte;
wherein the solid electrolyte includes naphthalenesulfonic acid compounds; and
wherein the solid electrolyte is formed by an electrolytic polymerization of the conductive polymer; the naphthalenesulfonic acid compounds corresponds to compound (II); and the compound (II) is doped into the conductive polymer

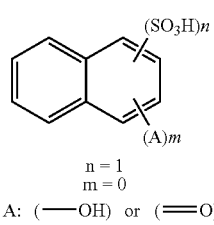 (II)

8. A method of manufacturing a solid electrolytic capacitor comprising
an anode composed of a valve metal,
a dielectric oxide film formed on a surface of the anode,
a solid electrolyte composed of a conductive polymer formed on the oxide film, and
a cathode formed on the solid electrolyte, the method comprising:
immersing the anode into a solution for polymerization containing a monomer forming the conductive polymer, naphthalenesulfonic acid compounds and water; and
forming the solid electrolyte on the oxide film by an electrolytic polymerization or a chemical polymerization;
wherein the napthalenesulfonic acid compounds corresponds to compound (I)

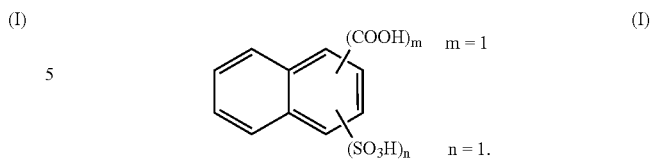 (I)

9. The method of manufacturing the solid electrolytic capacitor of claim 8, wherein the monomer is selected from at least one of pyrrole, thiophene, aniline and their derivatives.

10. The method of manufacturing the solid electrolytic capacitor of claim 8, wherein the electrolytic solution for polymerization further contains at least one of phenol derivatives, sulfuric acid and alcohols.

11. The method of manufacturing the solid electrolytic capacitor of claim 8, wherein the solution further contains 0.01 to 0.1 mol/L of a phenol derivative, and the phenol derivative is selected from at least one of nitropenol, cyanophenol, hydroxybenzoic acid, and hydroxyphenol.

12. The method of manufacturing the solid electrolytic capacitor of claim 8, wherein the solution further contains 0.01 to 1 wt % of a sulfuric acid.

13. The method of manufacturing the solid electrolytic capacitor of claim 8, wherein the solution further contains 0.5 to 20 wt % of alcohols, and the alcohols have a carbon number ranging from 1 to 4.

14. The method of manufacturing the solid electrolytic capacitor of claim 8, wherein a voltage applied for the electrolytic polymerization ranges from 1 to 3 V.

15. The method of manufacturing the solid electrolytic capacitor of claim 8, wherein voltages are applied on an external electrode and the anode composed of a valve metal respectively.

16. A method of manufacturing a solid electrolytic capacitor comprising
an anode composed of a valve metal,
a dielectric oxide film formed on a surface of the anode,
a solid electrolyte composed of a conductive polymer formed on the oxide film, and
a cathode formed on the solid electrolyte, the method comprising:
immersing the anode into a solution for polymerization containing a monomer forming the conductive polymer, naphthalenesulfonic acid compounds and water; and
forming the solid electrolyte on the oxide film by an electrolytic polmerization or a chemical polymerization;
wherein the naphthalenesulfonic acid compounds correspond to compound (II), and the solid electrolyte is formed by the electrolytic polymerization.

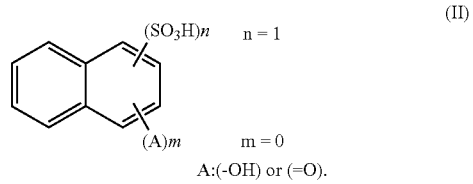 (II)

17. The method of manufacturing the solid electrolytic capacitor of claim 16, wherein the monomer is selected from at least one of pyrrole, thiophene, furan, aniline and their derivatives.

18. The method of manufacturing the solid electrolytic capacitor of claim 16, wherein the electrolytic solution for polymerization further contains organic solvents or nonionic surfactants to control a surface tension of the electrolytic solution for polymerization to smaller than $70 \times 10^{-3}$ N/m.

19. The method of manufacturing the solid electrolytic capacitor of claim 16, wherein the electrolytic solution for polymerization further contains phenol derivatives.

20. The method of manufacturing the solid electrolytic capacitor of claim 16, wherein the electrolytic solution for polymerization further contains phenol derivatives ranging 0.001 to 0.2 mol/L, and the phenol derivatives are selected from at least one of nitrophenol, cyanophenol, hydroxybenzoic acid, and hydroxyphenol.

* * * * *